United States Patent
Oh et al.

(10) Patent No.: US 10,629,962 B2
(45) Date of Patent: Apr. 21, 2020

(54) VEHICULAR BATTERY MODULE

(71) Applicants: HYUNDAI MOTOR COMPANY, Seoul (KR); KIA MOTORS CORPORATION, Seoul (KR)

(72) Inventors: Pil Gun Oh, Daejeon (KR); Yong Sub Yoon, Seoul (KR); Sang Mo Kim, Seoul (KR); Yun Sung Kim, Seoul (KR); Hong Seok Min, Yongin-si (KR); Oh Min Kwon, Nam-gu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 15/804,851

(22) Filed: Nov. 6, 2017

(65) Prior Publication Data
US 2018/0331398 A1    Nov. 15, 2018

(30) Foreign Application Priority Data

May 12, 2017 (KR) .......................... 10-2017-0058977

(51) Int. Cl.
| | |
|---|---|
| H01M 10/44 | (2006.01) |
| H01M 2/10 | (2006.01) |
| H01M 2/20 | (2006.01) |
| H01M 2/34 | (2006.01) |
| H01M 2/02 | (2006.01) |

(52) U.S. Cl.
CPC ....... *H01M 10/441* (2013.01); *H01M 2/1077* (2013.01); *H01M 2/206* (2013.01); *H01M 2/345* (2013.01); *H01M 10/445* (2013.01); *H01M 2/0207* (2013.01); *H01M 2220/20* (2013.01)

(58) Field of Classification Search
CPC .... H01M 2/20–28; H01M 2/34; H01M 2/345; H01M 10/441; H01M 10/445
See application file for complete search history.

(56) References Cited

U.S. PATENT DOCUMENTS

| | | | | |
|---|---|---|---|---|
| 2006/0093896 A1* | 5/2006 | Hong | ...................... | H01M 2/34 429/61 |
| 2007/0054157 A1* | 3/2007 | Ryu | ........................ | H01M 2/34 429/7 |

FOREIGN PATENT DOCUMENTS

| | | |
|---|---|---|
| JP | 3919002 B2 | 5/2007 |
| KR | 10-0921647 B1 | 10/2009 |
| KR | 10-2017-0022149 A | 3/2017 |

* cited by examiner

*Primary Examiner* — Stephan J Essex
(74) *Attorney, Agent, or Firm* — Morgan, Lewis & Bockius LLP

(57) ABSTRACT

A vehicular battery module that is capable of securing the stability of a vehicle by inducing self-discharge of a battery cell when the battery is overcharged includes: a plurality of stacked battery cells, each of which includes a battery pouch and electrode terminals extending outwards from the battery pouch, and a variable-resistor disposed between the electrode terminals of the one-side battery pouch and the other-side battery pouch so as to electrically connect the two electrode terminals to each other.

6 Claims, 4 Drawing Sheets

VEHICULAR BATTERY MODULE

CROSS REFERENCE TO RELATED APPLICATION

The present application is based on and claims the benefit of priority to Korean Patent Application No. 10-2017-0058977, filed on May 12, 2017 with the Korean Intellectual Property Office, the entire contents of which are incorporated herein for all purposes by this reference.

TECHNICAL FIELD

The present disclosure relates to a vehicular battery module, and more particularly, to a vehicular battery module, which can ensure the stability of the vehicle by inducing self-discharge of a battery cell when the battery is overcharged.

BACKGROUND

With the recent increase in the capacity of vehicular batteries, there is growing interest in the stability of batteries. When a battery is charged beyond an upper-limit voltage due to abnormality of a charging process, ignition or explosion may occur due to the generation of gas and heat inside a battery cell.

Accordingly, there has been a need for a solution that is capable of ensuring the stability of a vehicle by inducing self-discharge of a battery cell when the battery cell swells.

It should be noted that the matter described above as the background art is provided merely for the purpose of promoting the understanding of the background of the present disclosure, and the foregoing description shall not be taken as acknowledging the above-described matter as prior art already known to those skilled in the art.

SUMMARY

The present disclosure has been made in order to solve the problems described above, and the present disclosure provides a vehicular battery module, which can ensure the stability of a vehicle by inducing self-discharge of a battery cell when the battery is overcharged.

In order to achieve the above-described object, a vehicular battery module according to the present disclosure includes: a plurality of stacked battery cells, each of which includes a battery pouch and electrode terminals extending outwards from the battery pouch, in which a negative electrode terminal of an one-side battery pouch and a positive electrode terminal of an other-side battery pouch are disposed to face each other; and a variable-resistor disposed between the electrode terminals of the one-side battery pouch and the other-side battery pouch so as to electrically connect the two electrode terminals to each other, in which when the one-side battery pouch or the other-side battery pouch swells, the variable-resistor is compressed such that a resistance value thereof is decreased.

The vehicular battery module further includes: a connecting bar, one end of which is disposed between ends of the one-side battery pouch and the other-side battery pouch such that when the one-side battery pouch or the other-side battery pouch swells, the connecting bar transfers a swelling force to the variable-resistor.

The variable-resistor includes a dial configured to change a resistance value by being rotated, and the dial of the variable-resistor is connected to the other end of the connecting bar such that the dial can be rotated by the sliding of the other end of the connecting bar.

Two or more battery cells form a group, and the vehicular battery module further includes a metallic member disposed between one group of battery cells and another group of battery cells.

The metallic member is disposed between a battery pouch of the one group of battery cells and a battery pouch of the another group of battery cells, and is in close contact with a curved surface that extends from one of the battery pouches to the electrode terminal.

The vehicular battery module further includes support units that connect one surface of each of the one-side battery pouch and the other-side battery pouch with one end of the connecting bar and connect one surface of the variable-resistor with the other end of the connecting bar, thereby supporting the connecting bar.

A vehicular battery module includes: a plurality of stacked battery cells, each of which includes a battery pouch and electrode terminals extending outwards from the battery pouch, in which a negative electrode terminal of an one-side battery pouch and a positive electrode terminal of an other-side battery pouch are disposed to face each other; a variable-resistor disposed between the electrode terminals of the one-side battery pouch and the other-side battery pouch so as to electrically connect the two electrode terminals to each other, in which when the one-side battery pouch or the other-side battery pouch swells, the variable-resistor is compressed such that the resistance value thereof is decreased; and a connecting bar, one end of which is disposed between ends of the one-side battery pouch and the other-side battery pouch such that when the one-side battery pouch or the other-side battery pouch swells, the connecting bar transfers a swelling force to the variable-resistor. Two or more battery cells form a group, and the vehicular battery module further comprises a metallic member disposed between one group of battery cells and another group of battery cells.

According to a vehicular battery module according to the present disclosure, it is possible to ensure the stability of a vehicle by inducing self-discharge of a battery cell when the battery is overcharged.

In addition, it is possible to prevent swelling, ignition, and explosion of a cell due to battery overcharging.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, vehicular battery modules according to various embodiments of the present disclosure will be described with reference to the accompanying drawings.

Figure 1:
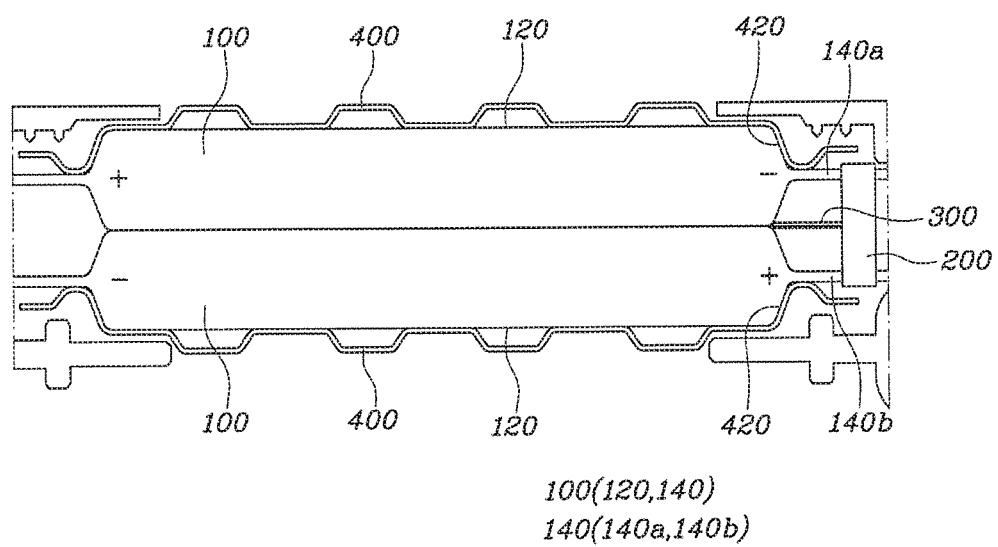
FIG. 1 is a view illustrating a first vehicular battery module structure according to an embodiment of the present disclosure.
Figure 2:
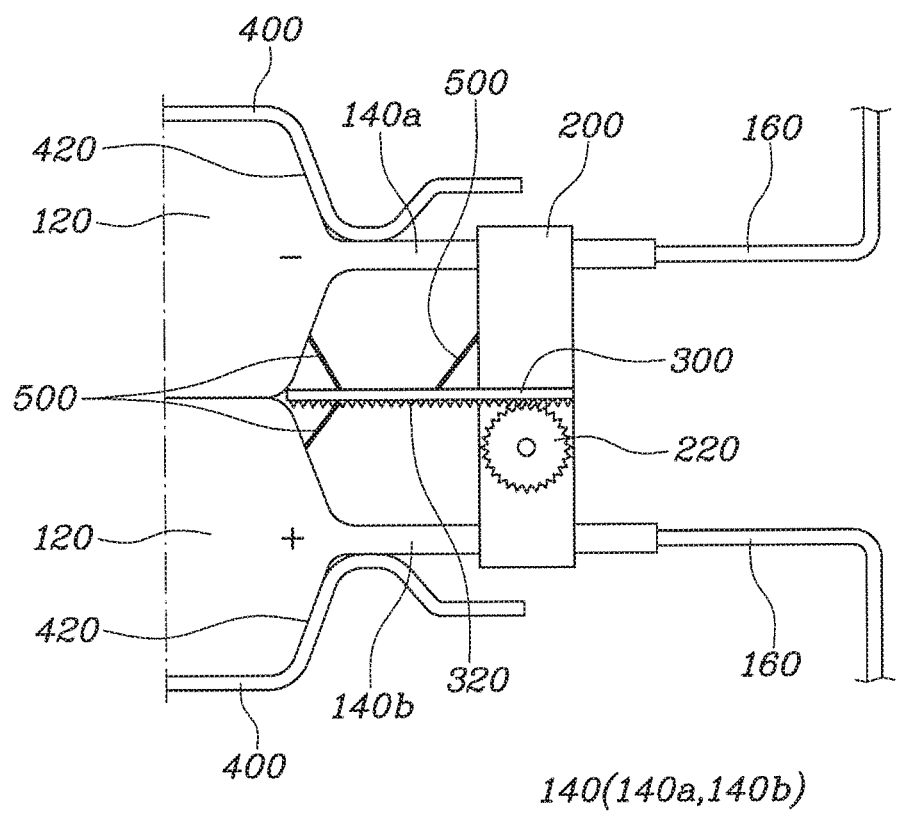
FIG. 2 is a view illustrating a second vehicular battery module structure according to an embodiment of the present disclosure.
Figure 3:
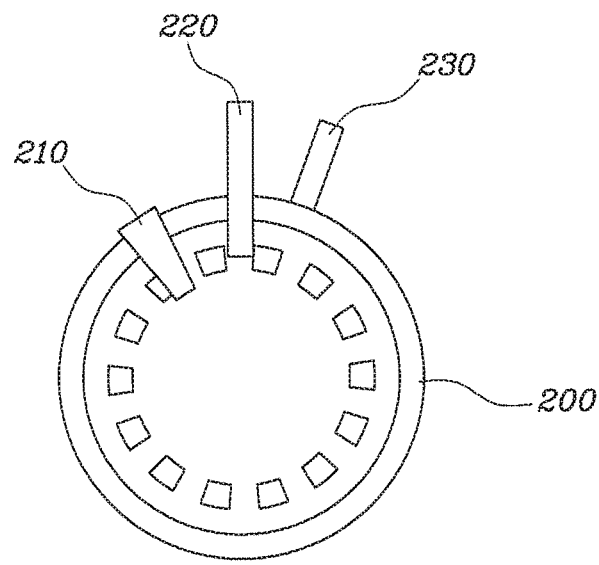
FIGS. 3 and 4 are views illustrating variable-resistor of a vehicular battery module according to an embodiment of the present disclosure.
Figure 4:
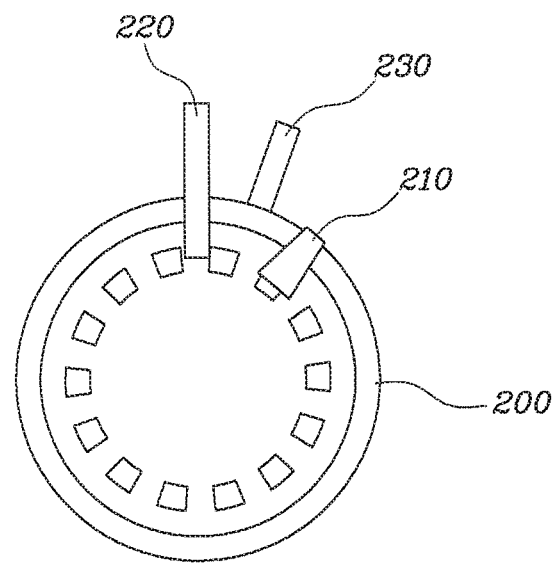

FIG. 1 is a view illustrating a first vehicular battery module structure according to an embodiment of the present disclosure, FIG. 2 is a view illustrating a second vehicular battery module structure according to an embodiment of the present disclosure, and FIGS. 3 and 4 are views illustrating variable-resistors of a vehicular battery module according to an embodiment of the present disclosure.

A cell is the smallest, packaged form a battery can take, and a battery module typically consists of several cells generally connected in series or in parallel. A battery pack is then assembled by connecting the battery modules together.

First, referring to FIG. 1, a vehicular battery module according to an embodiment of the present disclosure may include: a plurality of stacked battery cells 100, each of which includes a battery pouch 120 and electrode terminals 140 extending outwards from the battery pouch 120, in which a negative electrode terminal 140a of an one-side battery pouch and a positive electrode terminal 140b of an other-side battery pouch are disposed to face each other; and a variable-resistor 200 disposed between the electrode terminals 140a and 140b of the one-side battery pouch and the other-side battery pouch so as to electrically connect the two electrode terminals 140a and 140b to each other, in which when the one-side battery pouch or the other-side battery pouch swells, the variable-resistor 200 is compressed such that the resistance value thereof is decreased.

Here, as an embodiment of the present disclosure, the plurality of battery cells 100 may be stacked in such a manner that the negative electrode terminal 140a and the positive electrode terminal 140b face each other, and the variable-resistor 200 may be disposed between the negative electrode terminal 140a and the positive electrode terminal 140b. When the battery pouches 120 swell, the variable-resistor 200 is compressed, and as a result, the resistance value of the variable-resistor 200 may be decreased. Consequently, electrons may be moved from the negative electrode terminal 140a to the positive electrode terminal 140b, so that self-discharge of the battery cells may be induced.

As an embodiment of the present disclosure, the vehicle battery module may further include a connecting bar 300, one end of which is disposed between the ends of the one-side battery pouch and the other-side battery pouch such that when the one-side battery pouch or the other-side battery pouch swells, the connecting bar 300 transfers a swelling force to the variable-resistor 200.

Here, in the case of a pouch-type battery cell, gas is generated inside the pouch when overcharged, and a single battery pouch 120 swells in a direction perpendicular to a surface thereof by the gas. In a battery module structure in which a plurality of battery cells 100 are stacked as in the embodiment of the present disclosure, the battery cells 100 are brought into close contact with each other, and as a result, a swelling force acts toward the electrode terminals 140. The connecting bar 300 can transfer the swelling force to the variable-resistor 200 to reduce the resistance value of the variable-resistor 200, thereby inducing self-discharge between the battery cells. Furthermore, through the self-discharge of the battery cells, it is possible to prevent the explosion of the battery pouches 120, and to ensure the stability of the vehicle.

Referring to FIG. 2, the variable-resistor 200 may include a dial 220 configured to change a resistance value by rotation, and the dial 220 of the variable-resistor 200 may be connected to the other end of the connecting bar 300 such that the dial 220 can be rotated by the sliding of the other end of the connecting bar 300.

Here, as an embodiment of the present disclosure, the variable-resistor 200 may be of a dial-type, and the connecting bar 300 and the dial 220 of the variable-resistor 200 may form a meshing structure 320. In addition, through the meshing structure 320, the connecting bar 300 can rotate the dial 220 of the variable-resistor 200 by being slid by the swelling applied thereto when the battery pouches 120 are inflated due to battery overcharging. Due to this, the resistance value of the variable-resistor 200 may be decreased, and electrons may be moved from the negative electrode terminal 140a to the positive electrode terminal 140b, so that the self-discharge of the battery cells 100 can be induced.

FIG. 3 illustrates the dial-type variable-resistor 200 when the resistance value is high in a normal state in which the cells do not swell, and FIG. 4 illustrates the variable-resistor 200 in a state in which the resistance value is decreased when the battery cells swell. In the normal state in which the battery cells do not swell, the resistance value is large so that the negative electrode terminal 140a and the positive electrode terminal 140b may be in an open state, so that electrons cannot move from the negative terminal 140a to the positive electrode terminal 140b. On the other hand, in the state where when the battery cells swell so that the connecting bar 300 is slid by the swelling force so as to rotate the dial 220 of the variable-resistor 200, thereby decreasing the resistance value, the negative electrode terminal 140a and the positive electrode terminal 140b may be brought into a short-circuited state due to the reduced resistance value, so that electrons can move from the negative electrode terminal 140a to the positive electrode terminal 140b. As a result, discharge occurs from the battery cell 100 of the negative electrode terminal to the battery cell 100 of the positive electrode terminal, so that it is possible to prevent an ignition and/or an explosion of the battery cells which may occur due to an overcharging the battery cells.

Referring to FIGS. 1 and 2, in the vehicular battery module according to an embodiment of the present disclosure, two or more battery cells 100 may form a group and the vehicular battery module may further include a metallic member 400 disposed between one group of battery cells 100 and another group of battery cells 100.

Here, as an embodiment of the present disclosure, although FIGS. 1 and 2 illustrate two battery cells 100 among the plurality of battery cells 100 as one pair, the present disclosure is not limited thereto.

In addition, the metallic member 400 may be a heat radiation plate in one embodiment of the present disclosure. The metallic member 400 may be disposed between a battery pouch 120 of one pair of battery cells and another battery pouch 120 of another pair of battery cells, and may be in close contact with a curved surface 420 of each battery pouch 120, which leads to the electrode terminal 140 of the battery pouch 120. That is, the metallic member 400 may be disposed between one pair of battery cells 100 and another pair of battery cells 100 as illustrated in FIG. 1, and may be in close contact with the curved surface 420 that extends from the battery pouch 120 to the electrode terminal 140.

Here, since the metallic member 400 is in close contact with an opposite curved surface 420 that is not connected to the connecting bar 300, the battery pouch 120 may swell to a portion where the metallic member 400 does not come in contact at the time of overcharging, and may provide a stronger swelling force through the curved surface connected to the connecting bar 300. Due to this, compared to a battery module structure in the related art in which a metallic member is not in contact with a curved surface of a battery pouch, the resistance value of the variable-resistor 200 can be further reduced when the battery cells swell, so that self-discharge can be induced relatively effectively.

Referring to FIG. 2, in one embodiment of the present disclosure, the vehicular battery module may further include support units 500, which connect one surface of each of the one-side battery pouch and the other-side battery pouch to one end of the connecting bar 300 and connect one surface of the variable-resistor 200 and the other end of the connecting bar 300, thereby supporting the connecting bar 300.

Here, in one embodiment, the support units 500 of FIG. 2 support the connecting bar 300, one end of which is disposed between the ends of the one-side battery pouch and the other-side battery pouch and the other end is connected to the variable-resistor 200, so that the connecting bar 300 can transfer the swelling force, which is directed to the electrode terminals 140, to the variable-resistor 200 without breaking away.

Figure 5:
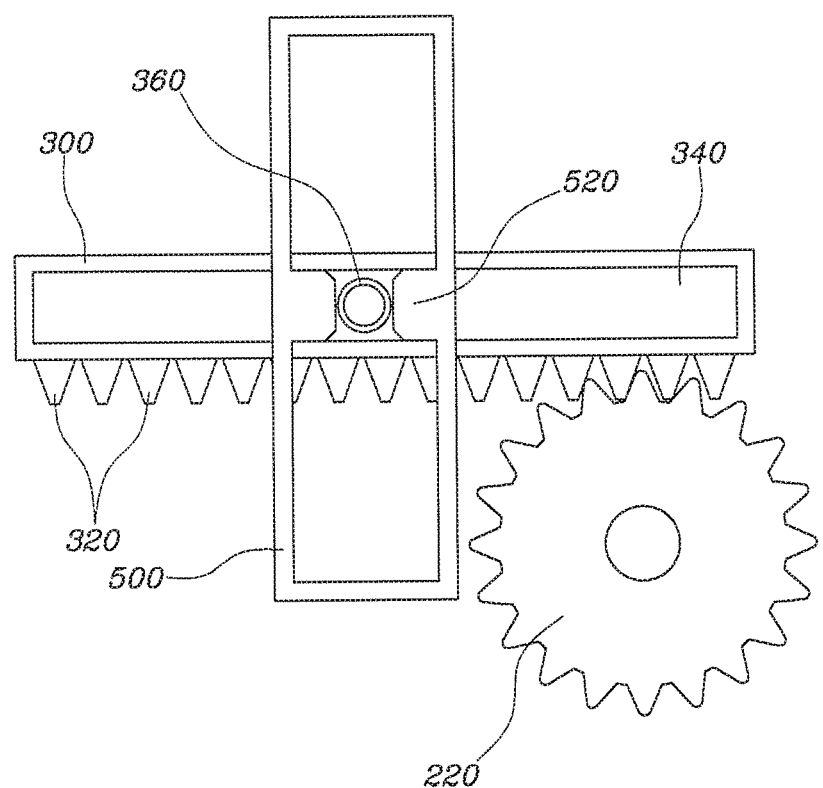
FIG. 5 is a view illustrating a support unit of a vehicular battery module according to another embodiment of the present disclosure.

Referring to FIG. 5, in a second embodiment of the present disclosure, the support unit 500 may include a protrusion 520 and may be disposed between the negative electrode terminal 140a and the positive electrode terminal 140b, and the connecting bar 300 may include a recessed groove portion 340. The protrusion 520 of the support unit 500 may be inserted into the groove portion 340 of the connecting bar 300, so that the protrusion 520 may serve to enforce directionality such that when the battery cells swell, the connecting bar 300 can transfer the swelling force, which is directed to the electrode terminal 140, to the variable-resistor 200 without breaking away. In a third embodiment, the connecting bar 300 may further include a moving unit 360 that is capable of moving in the horizontal direction along the groove portion 340. The protrusion 520 of the support unit 500 may serve to fix the moving unit 360 such that the connecting bar 300 can transfer the swelling force, which is directed to the electrode terminals 140, to the variable-resistor 200 without breaking away.

Although the stacked battery cells 100 are only partially illustrated in FIG. 2, the negative electrode terminals of one pair of battery cells and the positive electrode terminals of another pair of battery cells may be connected in series through elongated lead tabs 160.

A vehicular battery module according to the present disclosure may include: a plurality of stacked battery cells 100, each of which includes a battery pouch 120 and electrode terminals 140 extending outwards from the battery pouch 120, in which a negative electrode terminal 140a of an one-side battery pouch and a positive electrode terminal 140b of an other-side battery pouch are disposed to face each other; a variable-resistor 200 disposed between the electrode terminals 140a and 140b of the one-side battery pouch and the other-side battery pouch so as to electrically connect the two electrode terminals 140a and 140b to each other, in which when the one-side battery pouch or the other-side battery pouch swells, the variable-resistor 200 is compressed such that the resistance value thereof is decreased; and a connecting bar 300, one end of which is disposed between the ends of the one-side battery pouch and the other-side battery pouch such that when the one-side battery pouch or the other-side battery pouch swells, the connecting bar 300 transfers a swelling force to the variable-resistor 200, wherein two or more battery cells 100 form a group and the vehicular battery module further comprises a metallic member 400 disposed between one group of battery cells 100 and another group of battery cells 100.

As described above, in a vehicular battery module according to various embodiments of the present disclosure, it is possible to ensure the stability of a vehicle by inducing self-discharge of a battery cell when the battery is overcharged.

In addition, discharge occurs from a battery cell of a negative electrode terminal to a battery cell of a positive electrode terminal, so that it is possible to prevent ignition and explosion of the battery cells, which may occur due to overcharging.

While specific embodiments of the present disclosure have been illustrated and explained, it will be obvious to a person ordinarily skilled in the art that the present disclosure can be variously modified and changed without departing from the scope of the technical idea of the present disclosure, which is defined by the accompanying claims.

What is claimed is:

1. A vehicular battery module comprising:
a plurality of stacked battery cells, each of which includes a battery pouch and electrode terminals extending outwards from the battery pouch, wherein a negative electrode terminal of an one-side battery pouch and a positive electrode terminal of an other-side battery pouch are disposed to face each other;
a variable-resistor disposed between the electrode terminals of the one-side battery pouch and the other-side battery pouch so as to electrically connect the two electrode terminals to each other, wherein when the one-side battery pouch or the other-side battery pouch swells, the variable-resistor is compressed such that a resistance value thereof is decreased; and
a connecting bar, one end of which is disposed between ends of the one-side battery pouch and the other-side battery pouch such that when the one-side battery pouch or the other-side battery pouch swells, the connecting bar transfers a swelling force to the variable-resistor.

2. The vehicular battery module of claim 1, wherein the variable-resistor includes a dial configured to change a resistance value by being rotated, and
the dial of the variable-resistor is connected to a remaining end of the connecting bar such that the dial can be rotated by sliding of the remaining end of the connecting bar.

3. The vehicular battery module of claim 1 wherein two or more battery cells form a group and the vehicular battery module further comprises a metallic member disposed between one group of battery cells and another group of battery cells.

4. The vehicular battery module of claim 3, wherein the metallic member is disposed between a battery pouch of the one group of battery cells and a battery pouch of the another group of battery cells, and is in close contact with a curved surface that extends from one of the battery pouches to the electrode terminal.

5. The vehicular battery module of claim 1, further comprising:
support units that connect one surface of each of the one-side battery pouch and the other-side battery pouch with one end of the connecting bar and connect one surface of the variable-resistor with a remaining end of the connecting bar, thereby supporting the connecting bar.

6. A vehicular battery module comprising:
a plurality of stacked battery cells, each of which includes a battery pouch and electrode terminals extending outwards from the battery pouch, wherein a negative electrode terminal of an one-side battery pouch and a positive electrode terminal of an other-side battery pouch are disposed to face each other;

a variable-resistor disposed between the electrode terminals of the one-side battery pouch and the other-side battery pouch so as to electrically connect the two electrode terminals to each other, wherein when the one-side battery pouch or the other-side battery pouch swells, the variable-resistor is compressed such that a resistance value thereof is decreased; and a connecting bar, one end of which is disposed between ends of the one-side battery pouch and the other-side battery pouch such that when the one-side battery pouch or the other-side battery pouch swells, the connecting bar transfers a swelling force to the variable-resistor, wherein two or more battery cells form a group and the vehicular battery module further comprises a metallic member disposed between one group of battery cells and another group of battery cells.

* * * * *